(12) United States Patent
Hyeon-Yong

(10) Patent No.: US 7,173,381 B2
(45) Date of Patent: Feb. 6, 2007

(54) BACKLIGHT UNIT FOR LIQUID CRYSTAL DISPLAY

(75) Inventor: Jang Hyeon-Yong, Ohsan (KR)

(73) Assignee: Samsung Electronics Co., Ltd. (KR)

( * ) Notice: Subject to any disclaimer, the term of this patent is extended or adjusted under 35 U.S.C. 154(b) by 266 days.

(21) Appl. No.: 10/729,535

(22) Filed: Dec. 5, 2003

(65) Prior Publication Data

US 2004/0113631 A1 Jun. 17, 2004

(30) Foreign Application Priority Data

Dec. 6, 2002 (KR) .................. 10-2002-0077307

(51) Int. Cl.
*H05B 37/00* (2006.01)
(52) U.S. Cl. ............... 315/224; 315/169.3; 315/DIG. 4
(58) Field of Classification Search ................ 315/224, 315/169.3, DIG. 4
See application file for complete search history.

(56) References Cited

U.S. PATENT DOCUMENTS 6,184,631 B1 * 2/2001 Noma et al. ................ 315/224
6,407,480 B1 * 6/2002 Nakanishi et al. ...... 310/316.01
2003/0222537 A1 * 12/2003 Chou ........................ 310/318

* cited by examiner

*Primary Examiner*—David Vu
(74) *Attorney, Agent, or Firm*—MacPherson, Kwok, Chen & Heid LLP

(57) ABSTRACT

The invention provide a cost effective way of determining the status of a light emitting device, such as a light emitting device in a non-emitting display device. The apparatus includes a plurality of light emitting devices arranged in a predefined configuration, a voltage supply coupled to the light emitting devices for making a current flow through the light emitting devices, and electrically conductive devices positioned a predetermined distance away from the light emitting devices, wherein each of the electrically conductive devices generates a voltage in response to current flowing through one of the light emitting devices. An AND gate coupled to the electrically conductive devices receives the voltage from each of the electrically conductive devices through an input and generates an output. A status determining device coupled to the output of the AND gate determines the status of the light emitting devices based on this output.

19 Claims, 7 Drawing Sheets

BACKLIGHT UNIT FOR LIQUID CRYSTAL DISPLAY

BACKGROUND OF THE INVENTION (a) Field of the Invention

The present invention relates to a backlight unit for a liquid crystal display.

(b) Description of Related Art

Display screens, such as computer and television monitors, are usually made of either self-emitting displays or non-emitting displays. Examples of self-emitting displays include light emitting diodes (LEDs), electroluminescences (ELs), vacuum fluorescent displays (VFDs), field emission displays (FEDs) and plasma display panels (PDPs). A commonly used non-emitting display includes liquid crystal displays (LCDs). Non-emitting displays, unlike self-emitting displays, require a light source.

An LCD includes two panels coupled with field-generating electrodes and a liquid crystal (LC) layer with dielectric anisotropy interposed therebetween. When electric voltages are applied to the field-generating electrodes, an electric field is generated in the liquid crystal layer in response to the voltages. Light transmittance through the LC layer varies depending on the electric field. Thus, light transmittance is controlled by varying the applied voltages. By manipulating the applied voltages, desired images are displayed on the liquid crystal display.

The LCD being a non-emitting type of display, the light that is used to display the images is supplied by a separate source. This separate source may be an artificial light source such as a lamp coupled to the LCD, or a natural source like the sun. When using an artificial light source, the total brightness of the LCD screen is usually adjusted by either using an inverter to regulate the ratio of the on and off signals supplied to the light source or by regulating the current through the light source.

Typically, a large LCD requires several light sources (e.g., lamps) for uniform luminance across the LCD. When several lamps are used, the lamps are driven by a driving circuit, such as an inverter, for cost efficiency. When multiple lamps are used, however, there is a downside of not being able to easily detect a malfunctioning of one of the lamps, which may be caused by the one lamp being improperly mounted or simply defective. Malfunctioning of one lamp is highly undesirable as it may cause arcs near electrodes of the lamp. Aside from being a visual imperfection on the display, the arcs can pose a hazard by causing fire. A method of detecting a malfunctioning lamp is desired.

SUMMARY OF THE INVENTION

The invention provides a method and apparatus for determining the status of a light emitting device (e.g., a lamp) in a cost effective manner, allowing a prompt detection of an incorrectly mounted or defective light emitting device. The apparatus includes a light emitting device, a voltage supply coupled to the light emitting device for making a current flow through the light emitting device, an electrically conductive device positioned a predetermined distance away from the light emitting device for generating a voltage in response to the current flowing through the light emitting device, and a status determining device for determining the status of the light emitting device based on the voltage from the electrically conductive device.

In another aspect, the apparatus includes a plurality of light emitting devices arranged in a predefined configuration, a voltage supply coupled to the light emitting devices for making a current flow through the light emitting devices, a plurality of electrically conductive devices positioned a predetermined distance away from the light emitting devices, wherein each of the electrically conductive devices generates a voltage in response to current flowing through one of the light emitting devices, an AND gate coupled to the electrically conductive devices such that the voltage from each of the electrically conductive devices forms an input to the AND gate, the AND gate generating an output, and a status determining device coupled to the output of the AND gate to determine the status of the light emitting device based on the output.

The invention also includes a liquid crystal display device including a liquid crystal display panel, electrodes for generating an electric field in the liquid crystal display panel, and one of the above apparatuses.

The method of the invention includes generating a voltage in response to a current flowing through each of the light emitting devices, processing the voltage of the light emitting devices to generate an output voltage, and determining whether any of the light emitting devices is in an abnormal operational state based on the output voltage.

BRIEF DESCRIPTION OF THE DRAWINGS

The present invention will become more apparent by describing preferred embodiments thereof in detail with reference to the accompanying drawings in which.

DETAILED DESCRIPTION OF PREFERRED EMBODIMENTS

Figure 1:
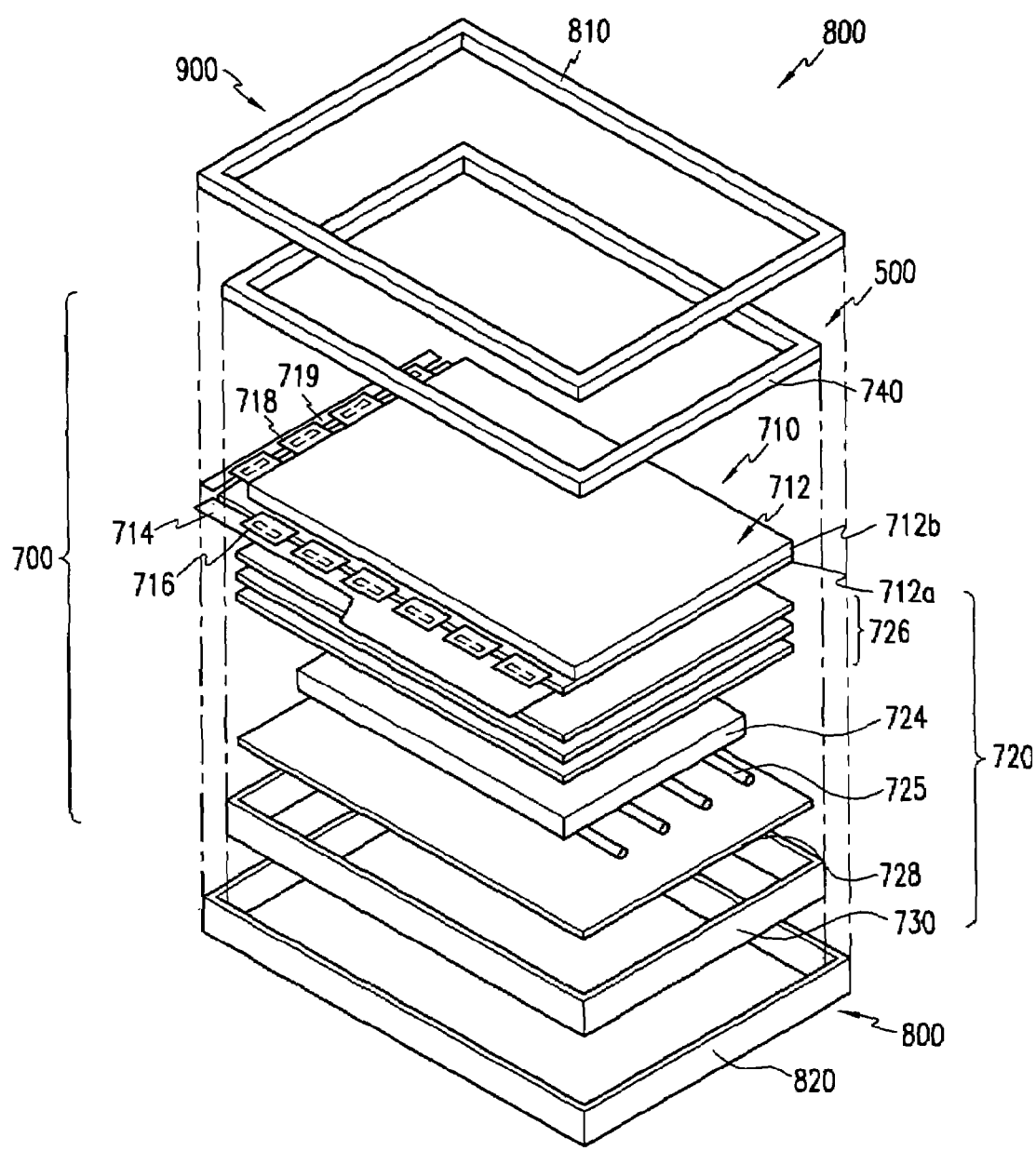
FIG. 1 is an exploded perspective view of an LCD according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Likewise, when an element is referred to as being "coupled to" another element, the elements may be directly connected or connected through one or more intervening elements.

Backlight units for a liquid crystal display will be described in detail with reference to the accompanying drawings.

FIG. 1 is an exploded perspective view of an LCD according to an embodiment of the present invention.

An LCD 900 according to an embodiment of the present invention includes an LC module 700 including a display unit 710 and a backlight unit 720, a pair of front and rear cases 810 and 820, a chassis 740, and a mold frame 730. The mold frame 730 hold the LC module 700 together by framing its components, as shown in FIG. 1.

The display unit 710 includes the LC panel assembly 712, a plurality of gate tape carrier packages (TCPs) 718, a plurality of data TCPs 716 attached to the LC panel assembly 712, a gate printed circuit board (PCB) 719, and a data PCB 714 attached to the associated TCPs 718 and 716, respectively.

The LC panel assembly 712, in structural view shown in FIG. 1, includes a lower panel 712a, an upper panel 712b and a liquid crystal layer (not shown) interposed therebetween while it includes a plurality of display signal lines (not shown) and a plurality of pixels (not shown) connected thereto and arranged substantially in a matrix.

The display signal lines are provided on the lower panel 712a and include a plurality of gate lines (not shown) transmitting gate signals (called scanning signals) and a plurality of data lines (not shown) transmitting data signals. The gate lines extend substantially in a row direction and are substantially parallel to each other, while the data lines extend substantially in a column direction and are substantially parallel to each other.

Each pixel includes a switching element connected to the display signal lines, an LC capacitor, and a storage capacitor that are connected to the switching element. The storage capacitor may be omitted if unnecessary.

The switching element (e.g., a TFT) is provided on the lower panel 712a and has three terminals: a control terminal connected to one of the gate lines, an input terminal connected to one of the data lines, and an output terminal connected to the LC capacitor and the storage capacitor.

The LC capacitor includes a pixel electrode (not shown) on the lower panel 712a, a common electrode (not shown) on the upper panel 712b, and the LC layer as a dielectric between the electrodes. The pixel electrode is connected to the switching element and preferably made of transparent conductive material such as indium tin oxide (ITO) and indium zinc oxide (IZO) or reflective conductive material. The common electrode covers the entire surface of the upper panel 712a and is preferably made of transparent conductive material such as ITO and IZO and supplied with a common voltage. Alternatively, both the pixel electrode and the common electrode, which are shaped and arranged like bars or stripes, are provided on the lower panel 712a.

The storage capacitor is an auxiliary capacitor for the LC capacitor. The storage capacitor includes the pixel electrode and a separate signal line (not shown), which is provided on the lower panel 712a, overlaps the pixel electrode via an insulator, and is supplied with a predetermined voltage such as the common voltage. Alternatively, the storage capacitor includes the pixel electrode and an adjacent gate line called a previous gate line, which overlaps the pixel electrode via an insulator.

For color display, each pixel represents its own color by providing one of a plurality of red, green and blue color filters in an area occupied by the pixel electrode. The color filter is provided in the corresponding area of the upper panel 712b. Alternatively, the color filter is provided on or under the pixel electrode on the lower panel 712a.

Referring to FIG. 1, the backlight unit 720 includes a plurality of lamps 725 disposed under the LC panel assembly 712, a light guide 724 and a plurality of optical sheets 726 disposed between the panel assembly 712 and the lamps 725 for guiding and diffusing light from the lamps 725 to the panel assembly 712, and a reflector 728 disposed under the lamps 725 for reflecting the light from the lamps 725 toward the panel assembly 712.

The light guide 724 has uniform thickness, and the number of the lamps 725 is determined in consideration of the operation of the LCD. The lamps 725 preferably include fluorescent lamps such as CCFL (cold cathode fluorescent lamp) and EEFL (external electrode fluorescent lamp). An LED is another example of the lamp 725.

A pair of polarizers (not shown) polarizing the light from the lamps 725 are attached on the outer surfaces of the panels 712a and 712b of the panel assembly 712.

The TCPs 716 and 718 are flexible printed circuit (FPC) films that are attached to the edges of the LC panel assembly 712. A plurality of data driving integrated circuit (IC) chips connected to the data lines of the LC panel assembly 712 and applying data voltages thereto are mounted on the data TCP 716. Similarly, a plurality of gate driving IC chips connected to the gate lines of the LC panel assembly 712 and applying gate voltages thereto after combining a gate-on voltage and a gate-off voltage are mounted on the data TCP 718.

The PCBs 714 and 719 are connected to the TCPs 716 and 718 and include circuit elements for receiving image signals and input control signals for controlling the image signals, processing the image signals, and generating output control signals for the processed image signals to be provided for the driving ICs on the TCPs 716 and 718.

According to other embodiments of the present invention, the gate driving circuits and/or the data driving circuits are chip-mounted on the lower panel 712a, while one or both of the driving circuits are incorporated along with other elements into the lower panel 712a. The gate PCB 719 and/or the gate FPC films 718 may be omitted in both cases.

A backlight assembly for an LCD according to an embodiment of the present invention will be described in detail with reference to FIGS. 2–4.

Figure 2:
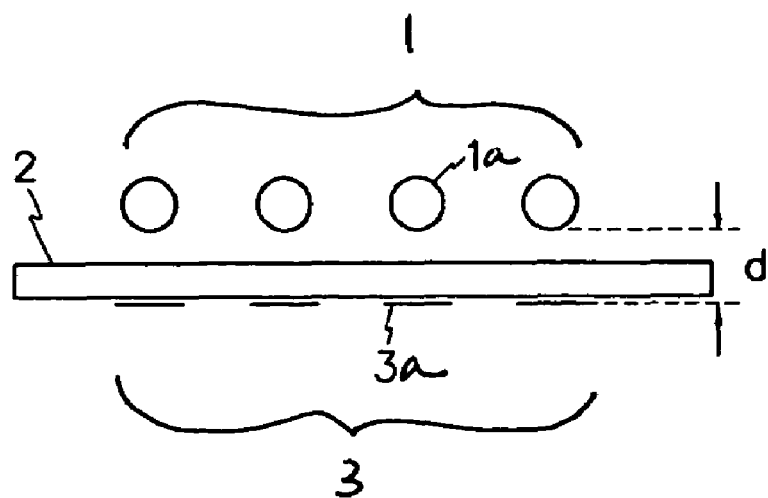
FIG. 2 is a section view of a backlight assembly for an LCD according to an embodiment of the present invention.
Figure 3:
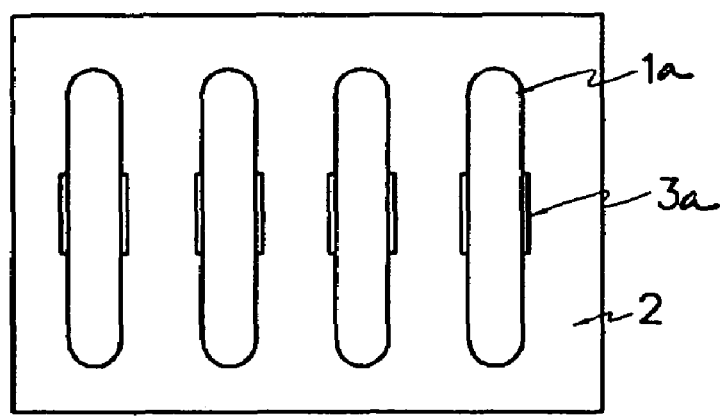
FIG. 3 is a front view of the backlight assembly shown in FIG. 2.

FIG. 2 is a section view of a backlight assembly for an LCD according to an embodiment of the present invention, and FIG. 3 is a front view of the backlight assembly shown in FIG. 2.

Referring to FIGS. 2 and 3, a backlight assembly for an LCD according to an embodiment of the present invention includes a reflector 2, a plurality of lamps 1 spaced apart from a front surface of the reflector 2 and arranged parallel to each other, and a plurality of metal sheets 3 located on a rear surface of the reflector 2. The number of the metal sheets 3 is equal to the number of the lamps 1, and the metal sheets 3 are aligned with the respective lamps 1. Each lamp 1 and the corresponding metal sheet 3 are spaced apart from each other by a distance d as shown in FIG. 2.

The lamps 1 are external electrode fluorescent lamps (EEFLs), each including a tube and a pair of electrodes provided external to the tube. However, the lamps 1 may be other types of lamps such as cold cathode fluorescent lamp (CCFLs).

The backlight assembly according to this embodiment adopts a floating application that applies positive and negative voltages to both terminals of the lamps 1.

Upon application of AC voltages to both terminals of the lamps 1, each lamp 1 acts as a resistor to flow high current, and emits light. A voltage proportional to the voltage across the lamp 1 is induced in the metal sheet 3 spaced apart from the lamp 1 by the distance d since the metal sheet 3 and the lamp 1 act as a capacitor. If the lamp 1 operates in abnormal state due to some reasons such as improper mounting of the lamp 1 or breakage of the lamps 1, the induced voltage in the metal sheet 3 is likely to be very low, perhaps even nonexistent. The distance d is preferably selected so that very little voltage induction occurs from adjacent lamps 1. Thus, the operational state or status of the lamps 1 can be determined by measuring the voltages induced in the metal sheets 3.

Figure 4:
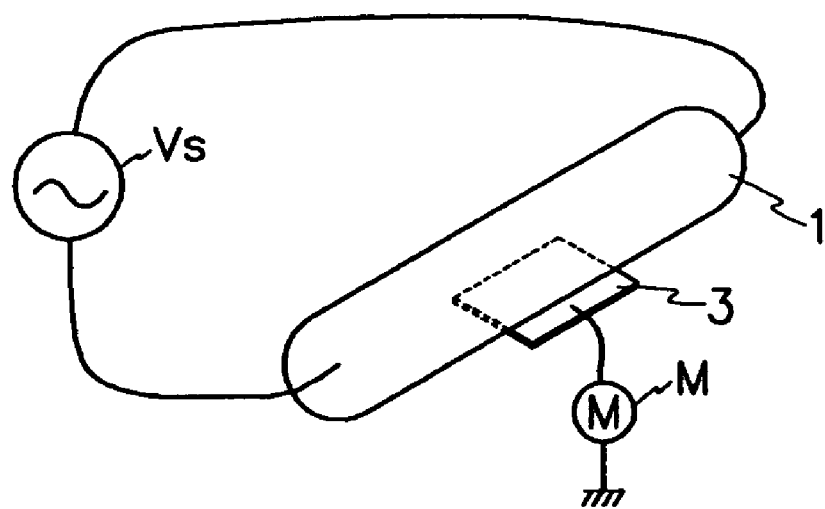
FIG. 4 illustrates an experiment for measuring a voltage induced in a metal sheet in the backlight assembly shown in FIGS. 2 and 3.

FIG. 4 illustrates an experiment that was conducted to test the correlation between the status of a lamp and the voltage induced in a metal sheet near the lamp in the backlight assembly of FIGS. 2 and 3.

Referring to FIG. 4, an AC voltage Vs was applied across a plurality of lamps 1 including the lamp 1a that is shown, and a voltmeter M was connected to a metal sheet 3a, which is one of the metal sheets 3 that is spaced apart from the lamp 1a by a predetermined distance. The voltage of the metal sheet 3a measured by the voltmeter M was proportional to the voltage across the lamp 1a when the lamp 1a normally operated. When the voltage Vs was cut off from all the lamps, no voltage was measured by the voltmeter M. When the voltage Vs was supplied to all the lamps 1 except for the lamp 1a, the measured voltage of the metal sheet 3a was very small. Accordingly, it is expected that there is, at most, a very small induced voltage in the metal sheet 3a due to the parasitic coupling capacitance between adjacent lamps 1 and the metal sheet 3a if there is no current in the lamp 1a caused by the turning off, releasing, and cutting off, etc., of the lamp 1a.

A backlight unit for an LCD according to another embodiment of the present invention will be described in detail with reference to FIGS. 5, 6A and 6B.

Figure 5:
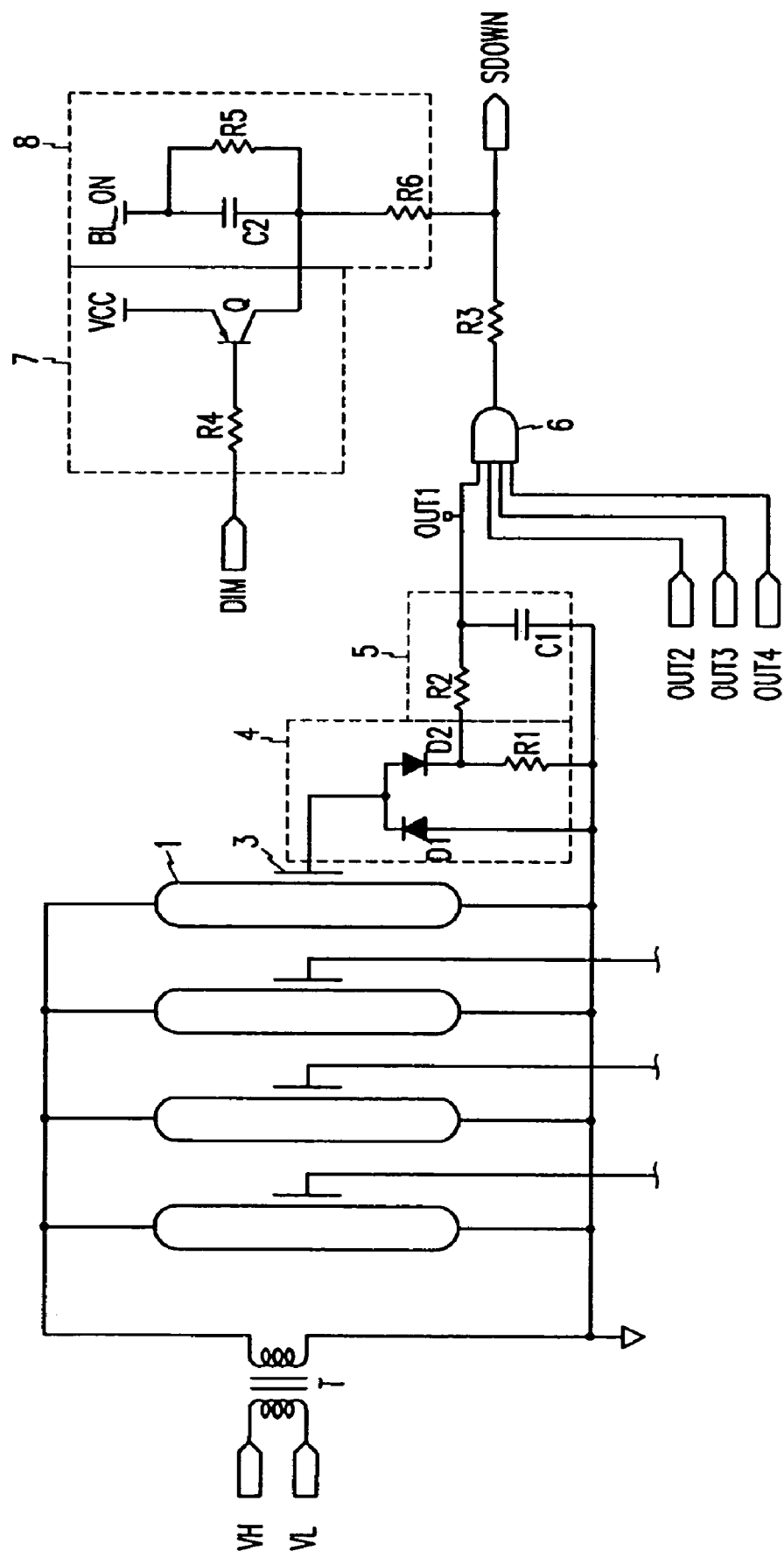
FIG. 5 is a circuit diagram of a backlight unit for an LCD according to another embodiment of the present invention.
Figure 6A:
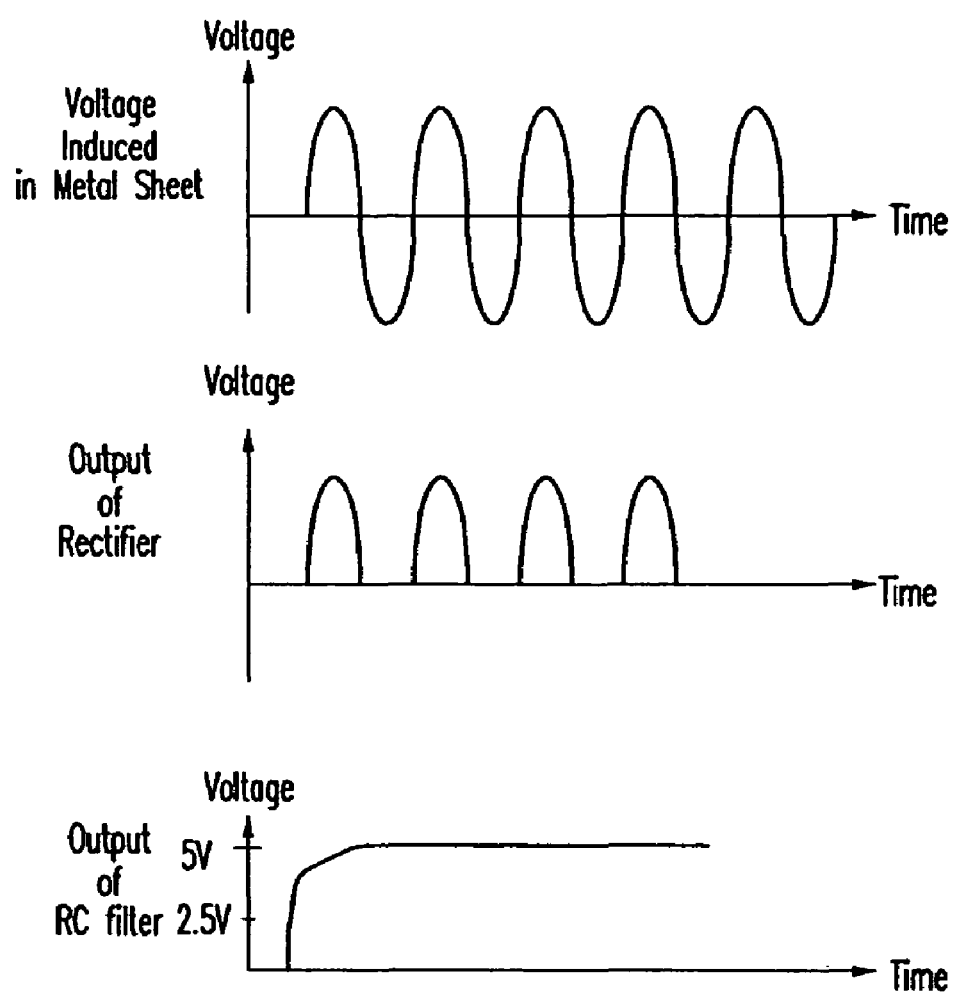
FIGS. 6A and 6B show waveforms of signals in the backlight unit shown in FIG. 5 for a normal operation and an abnormal operation, respectively.
Figure 6B:
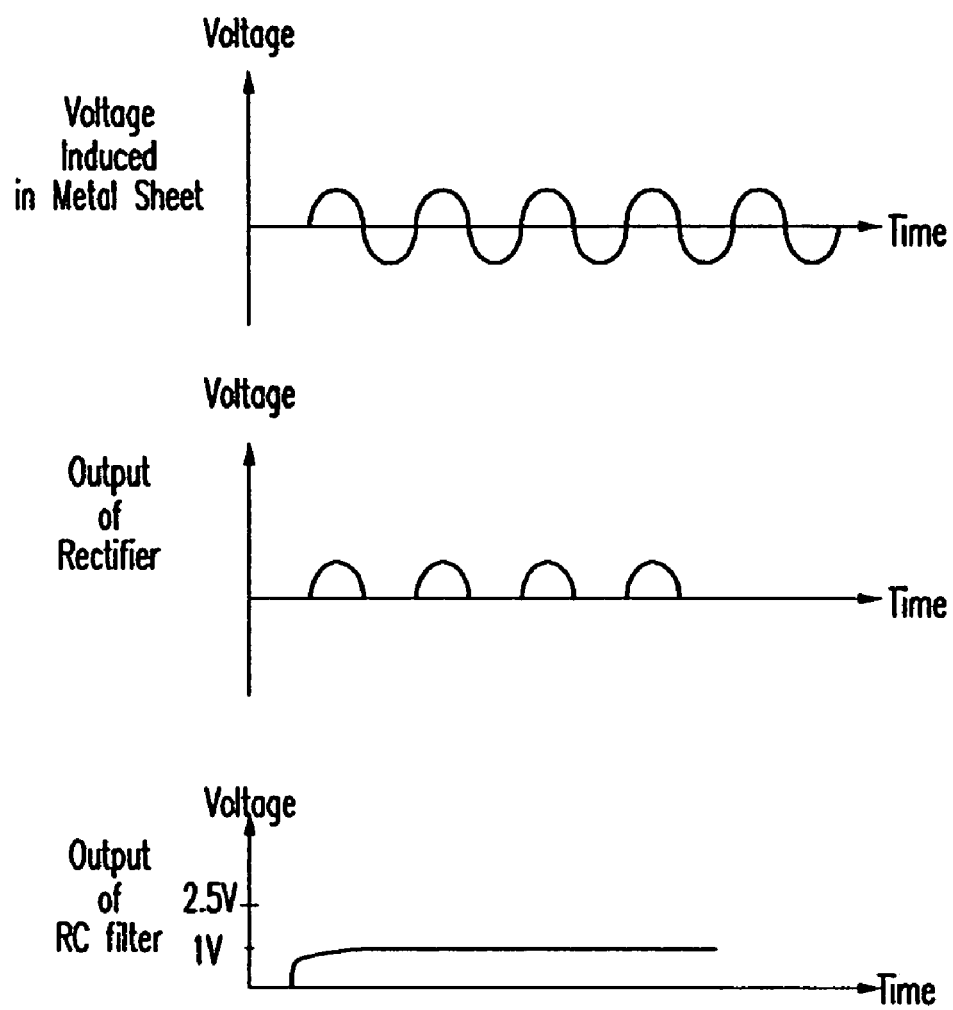

FIG. 5 is a circuit diagram of a backlight unit for an LCD according to another embodiment of the present invention, and FIGS. 6A and 6B show waveforms of signals in the backlight unit shown in FIG. 5 for a normal operation and an abnormal operation, respectively.

Referring to FIG. 5, a backlight unit for an LCD according to another embodiment of the present invention includes a transformer T supplied with an AC voltage VH and VL, a plurality of lamps 1 connected across the transformer T, a plurality of metal sheets 3 spaced apart from the respective lamps 1, a plurality of rectifier circuits 4 connected to the respective metal sheets 3, a plurality of RC filters 5 connected to the respective rectifier circuits 4, an AND gate 6 connected to the RC filters 5, a dimming error prevention circuit 7, and a time constant determining circuit 8. Preferably, the number of the metal sheets 3 is equal to the number of the lamps 1.

When the voltage VH and VL is applied to the lamps 1 through the transformer T, the lamps 1 start lighting and AC voltages having magnitudes proportional to a magnitude of the AC voltage VH and VL applied to the lamps 1 are induced in the corresponding metal sheets 3 as shown in FIGS. 6A and 6B.

As shown in FIGS. 6A and 6B, the rectifier 4 half-wave rectifies a signal from the metal sheet 3 as shown in FIGS. 6A and 6B, and the RC filter 5 removes ripples from the rectified signal output from the rectifier circuit 4 to convert the rectified signal into a stable DC signal.

In the embodiment of FIG. 5, the rectifier circuit 4 includes a diode D1 connected in reverse direction from the metal sheets 3, another diode connected in forward direction from the metal sheets 3, and a resistor R1 connected to the diode D2 for forming a current path. The diode D1 cuts off a negative component of the signal from the respective one of the metal sheets 3 that is connected to the rectifier circuit 4, while the diode D2 passes a positive component of the signal from the metal sheet. Accordingly, the rectifier circuit 4 passes only the positive component of the voltage signal induced in the metal sheet, effectuating a half-wave rectification.

The RC filter 5 receives the rectified signal outputted from the rectifier 4 through a node between the diode D2 and the resistor R1.

The RC filter 5 includes a resistor R2 and a capacitor C1 connected in series. The positive component of the voltage signal from the metal sheets 3 passes through the diode D2 and passes through a path including the resistor R1 and another path including the resistor R2 and the capacitor C1 of the RC filter 5. The positive voltage signal is charged in the capacitor C1 to be converted into an output DC voltage OUT1. Appropriate selection of the resistance of the resistor R2 and the capacitance of the capacitor C1 may yield the output voltage OUT1 of about 3.5V to 5V during the normal lighting operation of the lamp 1 as shown in FIG. 6A.

There are three operational states of the lamps 1: a normal active state, a normal inactive state, and an abnormal inactive state. The lamps 1 are driven to be turned on and turned off periodically by pulse-width modulation (PWM) dimming control with a predetermined on/off duty ratio. When the lamps 1 are in the normal or abnormal inactive state, the output voltage OUT1 reaches zero or a little value equal to or smaller than 1.2V as shown in FIG. 6B, which may be resulted from current leakage. Accordingly, the normal activation of the lamp 1 can be determined based on the output voltage OUT1 of the RC filter 5.

The output voltages OUT1–OUT4 of the RC filters 5 for the lamps 1 form the input signals to the AND gate 6, which performs the well-known AND operation on input signals and generates an output signal to be supplied to a status determining device including a shut down terminal, SDOWN. This output signal is sent through an output resistor R3 located between the AND gate 6 and the shut down terminal SDOWN. The threshold voltage of the AND gate 6 is set to be about 2.5V such that the AND gate 6 generates a high level output when all the input signals are equal to or higher than 2.5V while it generates a low level output when any one of the input signals are smaller than 2.5V. Accordingly, if any one of the lamps 1 is inactive, the output of the AND gate 6 drops to a level below the threshold voltage. The shut down terminal SDOWN cuts off the supply voltage to the lamps 1. A person of ordinary skill in the art will appreciate that the predefined ranges for delineating the high voltage level and the low voltage level, as well as the threshold voltage level, may be adjusted as appropriate.

One concern with the shut down terminal cutting off the supply voltage upon detecting a low output voltage is that the supply voltage becomes undesirably cut off when the lamps 1 are in the normal inactive state. While it is desirable to cut off the supply voltage only when the lamps 1 are in the abnormal state, the shut down terminal SDOWN cannot distinguish between a normal inactive state and an abnormal inactive state, since both states cause a drop in the output voltage level.

This concern is addressed by a dimming error prevention circuit 7. The dimming error prevention circuit 7 provides a high voltage signal to the shut down terminal SDOWN in response to a PWM dimming signal DIM, which has an on section and an off section when the lamps 1 are in the normal inactive state. The normally operating lamps 1 turn on during the on section of the dimming signal DIM, while they turn off during the off section of the dimming signal DIM. The dimming error prevention circuit 7 outputs the high voltage level signal during the off section of the dimming signal DIM. This high voltage output by the dimming error prevention circuit 7 prevents the shut down terminal from misinterpreting a normal inactive state as an abnormal inactive state, by effectively disguising the normal inactive state as a normal active state.

The dimming error prevention circuit 7 includes a transistor Q and an input resistor R4. The transistor Q is a pnp bipolar transistor having an emitter connected to a supply voltage VCC (herein also referred to as "an alternative supply voltage"), a base connected to the input resistor R4, and a collector connected to a shut down terminal SDOWN through an output resistor R6.

The dimming control signal DIM is fed into the base of the transistor Q through the input resistor R4. The transistor Q turns off during the on section of the dimming control signal DIM and, in this case, the output of the AND gate 6 is detected by the shut down terminal SDOWN without contribution from the dimming error prevention circuit 7. On the contrary, the transistor Q turns on during the off section of the dimming control signal DIM such that the supply voltage VCC of high level is supplied for the shut down terminal SDOWN. In this case, the shut down terminal SDOWN knows to ignore the low voltage output of the AND gate 6. As a result, the dimming error prevention circuit 7 enforces a high level signal to be detected by the shut down terminal when one or more of the lamps 1 are in the normal inactive state.

The lamps' transition from an active state to an inactive state, and vice versa, is not instant. Thus, a certain amount of time is needed for the lamps 1 to transition between the normal inactive state and the normal active state. When the lamps 1 first receive a transition signal to transition from the inactive state to the active state, it is desirable for the shut down signal to reflect this transition as soon as possible. Otherwise, the transition phase may be interpreted as an abnormal inactive state. Thus, a mechanism is required to maintain the output signal from the AND gate 6 at a high level while the lamps 1 transition.

A time constant determining circuit 8 shown in FIG. 5 delays an initial lighting signal BL_ON for the backlight unit during the transition of the lamps 1 and includes a capacitor C2 and a resistor R5 connected in parallel. The capacitance of the capacitor C2 and the resistance of the resistor R5 are determined such that the time constant preferably ranges about 0.3 seconds to about one second. As a result, the time constant determining circuit 8 provides a high level signal to the shut down terminal during the transition of the lamps 1 from an inactive state to an active state.

A backlight unit for an LCD according to another embodiment of the present invention is now described in detail with reference to FIG. 7.

Figure 7:
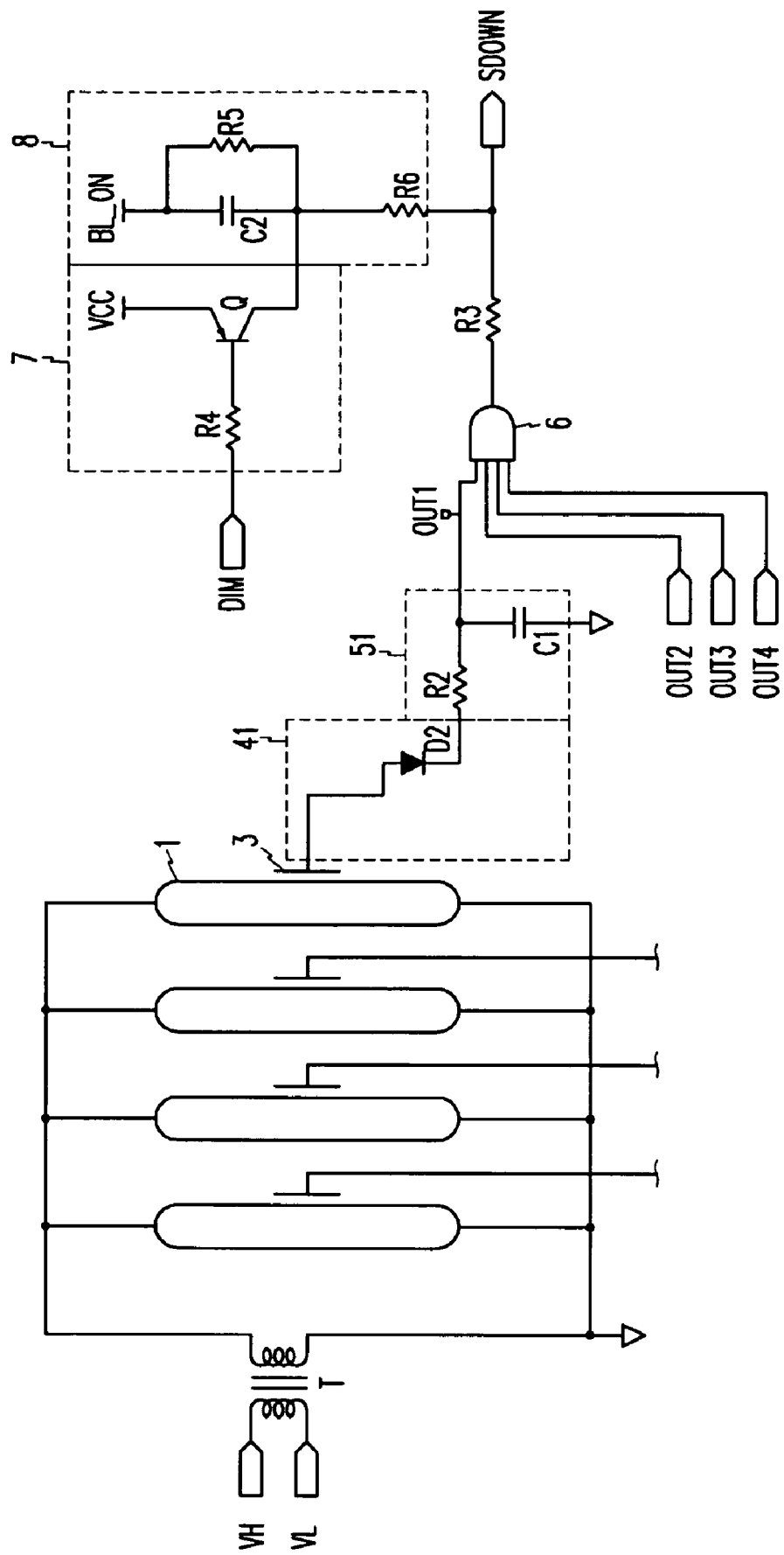
FIG. 7 is a circuit diagram of a backlight unit for an LCD according to another embodiment of the present invention.

FIG. 7 is a circuit diagram of a backlight unit for an LCD according to another embodiment of the present invention.

The backlight unit according to this embodiment directly detects voltages induced in metal sheets 3 and determines an abnormal state of lamps 1.

A backlight unit according to this embodiment includes a transformer T, a plurality of lamps 1, a plurality of metal sheets 3, a plurality of rectifier circuits 41, a plurality of RC filters 51, an AND gate 6, a dimming error prevention circuit 7, and a time constant determining circuit 8. The detailed configurations of the above-described elements are similar to those shown in FIG. 5 except for the rectifier circuits 41 and the RC filters 51.

The rectifier circuit 41 includes a diode D3 connected in forward direction from the metal sheet 3 to the RC filter 51, and the RC filter 51 includes a resistor R2 and a capacitor C1 connected in series.

A positive component of a voltage signal induced in the metal sheet 3 passes through the diode D3 and is charged in the capacitor C1. Accordingly, the output voltage OUT1 of the capacitor C1 represents a DC level of the positive component of the induced voltage and is inputted to the AND gate 6. The AND gate 6 performs an AND operation on inputs from the RC filters 51 connected to the metal sheets 3 and generates an output to be provided as a shut down signal.

As described above, backlight units according to embodiment of the present invention detect voltages induced in metal sheets, which are provided at respective lamps driven by an AC voltage, thereby determining whether the lamps operate in a normal condition. Accordingly, when the lamps are not properly mounted or when the lamps performs malfunction during the lighting, the power supply for the backlight unit can be blocked to remarkably reduce the occurrence of arcs near lamp electrodes and the occurrence of defects in product assembly.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

For example, in an alternative embodiment, only some of the multiple lamps in a device have a metal sheet 3. This alternative embodiment may be useful if there is a subgroup of lamps that are critical to the operation of the display device and only this subgroup is to be monitored.

What is claimed is:

1. An apparatus for checking a status of a light emitting device, the apparatus comprising:
    a light emitting device;
    a voltage supply coupled to the light emitting device for making a current flow through the light emitting device;
    an electrically conductive device spaced apart from the light emitting device for generating a voltage in response to the current flowing through the light emitting device;
    a status determining device for determining the status of the light emitting device based on the voltage from the electrically conductive device; and
    a rectifier circuit having a first node and a second node, wherein the first node is connected to the electrically conductive device and the second node is connected to a signal detector,
    wherein the voltage supply is an AC voltage supply, further comprising an RC filter circuit for converting an output from the rectifier circuit into a DC signal, wherein the RC filter circuit is connected to the rectifier circuit and the signal detector.

2. An apparatus for checking a status of a light emitting device, the apparatus comprising:
    a light emitting device;
    a voltage supply coupled to the light emitting device for making a current flow through the light emitting device;

an electrically conductive device spaced apart from the light emitting device for generating a voltage in response to the current flowing through the light emitting device; and a status determining device for determining the status of the light emitting device based on the voltage from the electrically conductive device, wherein the voltage having a level below a threshold value indicates that the light emitting device is operating abnormally, and a dimming error prevention circuit coupled to a node between the electrically conductive device and the status determining device, wherein the dimming error prevention circuit is for connecting the status determining device to an alternative voltage supply if the light emitting device is in a normal inactive state, so as to prevent the status determining device from interpreting the voltage generated by the light emitting device in a normal inactive state as the light emitting device being in an abnormal inactive state.

3. The apparatus of claim 2, wherein the dimming error prevention circuit comprises:

a transistor;

an alternative voltage source coupled to the transistor; and a dimming signal source coupled to the base of the transistor and generating an "on" signal upon detecting that the light emitting device is in a normal inactive state;

wherein the transistor is configured to connect the alternative voltage source to the status determining device in response to the "on" signal from the dimming signal source.

4. The apparatus of claim 2, wherein the dimming error prevention circuit comprises a transistor for supplying an alternative voltage to the status determining device upon receiving a signal indicating that the light emitting device is in a normal inactive state.

5. The apparatus of claim 2 further comprising a time constant determining circuit coupled to the node for creating a delay in the dimming error prevention circuit's disconnecting of the alternative voltage supply from the status determining device upon the light emitting device's transition between an inactive state and a normal active state.

6. An apparatus for checking a status of a light emitting device, the apparatus comprising:

a plurality of light emitting devices arranged in a predefined configuration;

a voltage supply coupled to the light emitting devices for making a current flow through the light emitting devices;

a plurality of electrically conductive devices positioned a predetermined distance away from the light emitting devices, wherein each of the electrically conductive devices generates a voltage in response to current flowing through one of the light emitting devices;

an AND gate coupled to the electrically conductive devices such that the voltage from each of the electrically conductive devices forms an input to the AND gate, the AND gate generating an output; and a status determining device coupled to the output of the AND gate to determine the status of the light emitting device based on the output.

7. The apparatus of claim 6, wherein the status determining device comprises a means for stopping the current from flowing through the light emitting devices if the output of the AND gate fulfills a predefined condition.

8. The apparatus of claim 6 further comprising a plurality of rectifier circuits, wherein each of the rectifier circuits is coupled to one of the electrically conductive devices and to the AND gate.

9. The apparatus of claim 8, wherein the voltage supply is an AC voltage supply, further comprising a plurality of conversion circuits for receiving an AC signal from the rectifier circuits and generating a DC voltage for inputting into the AND gate.

10. The apparatus of claim 9, wherein the conversion circuits comprise an RC filter.

11. The apparatus of claim 10 further comprising a dimming error prevention circuit coupled to a node between the AND gate and the status determining device, wherein the dimming error prevention circuit is for connecting the status determining device to an alternative voltage supply if at least one of the light emitting devices is in a normal inactive state, so that the status determining device receives a different output voltage from the AND gate when one of the light emitting devices is in a normal inactive state than when one of the light emitting devices is in an abnormal inactive state.

12. The apparatus of claim 11, wherein the dimming error prevention circuit comprises:

a transistor;

an alternative voltage source coupled to the transistor; and a dimming signal source coupled to the base of the transistor and generating an "on" signal upon detecting that the light emitting device is in a normal inactive state;

wherein the transistor is configured to connect the alternative voltage source to the status determining device in response to the "on" signal from the dimming signal source.

13. The apparatus of claim 11, wherein the dimming error prevention circuit comprises a transistor for supplying an alternative voltage to the status determining device upon receiving a signal indicating that the light emitting device is in a normal inactive state.

14. The apparatus of claim 11 further comprising a time constant determining circuit coupled to the node for creating a delay in the dimming error prevention circuit's disconnecting of the alternative voltage supply from the status determining device upon the light emitting device's transition between an inactive state and a normal active state.

15. A method of checking a status of a light emitting array, wherein the light emitting array includes a plurality of light emitting devices, the method comprising:

generating a voltage in response to a current flowing through each of the light emitting devices by using an electrically conductive device spaced apart from the light emitting device;

processing the voltage of the light emitting devices to generate an output voltage;

determining whether any of the light emitting devices is in an abnormal operational state based on the output voltage; and stopping the current flowing through each of the light emitting devices upon determining that at least one of the light emitting devices is in an abnormal operational state.

16. A liquid crystal display device comprising:

a liquid crystal display panel;

electrodes for generating an electric field in the liquid crystal display panel; and a backlight assembly including;

a first light emitting device;

a voltage supply coupled to the light emitting device for making a first current flow through the first light emitting device;

a first electrically conductive device spaced apart from the light emitting device for generating a first voltage in response to the first current flowing through the first light emitting device;

a status determining device for determining the status of the light emitting device based on the first voltage from the electrically conductive device;

a second light emitting device coupled to the voltage supply for making a second current flow through the second light emitting device;

a second electrically conductive device positioned for generating a second voltage in response to the second current; and an AND gate receiving the first voltage and the second voltage and generating an output voltage, wherein the output voltage is coupled to the status determining device, which determines the status based on the output voltage of the AND gate.

17. The liquid crystal display device of claim 16 further comprising a dimming error prevention circuit coupled to a node between the AND gate and the status determining device, wherein the dimming error prevention circuit comprises:

a transistor;

an alternative voltage source coupled to the transistor; and a dimming signal source coupled to the base of the transistor and generating an "on" signal upon detecting that the light emitting device is in a normal inactive state;

wherein the transistor is configured to connect the alternative voltage source to the status determining device in response to the "on" signal from the dimming signal source.

18. The liquid crystal display device of claim 16 further comprising a dimming error prevention circuit coupled to a node between the AND gate and the status determining device, wherein the dimming error prevention circuit comprises a transistor for supplying an alternative voltage to the status determining device upon receiving a signal indicating that the light emitting device is in a normal inactive state.

19. The liquid crystal display device of claim 18 further comprising a time constant determining circuit coupled to the node for creating a delay in the dimming error prevention circuit's disconnection of the alternative voltage from the status determining device when the light emitting device transitions between an inactive state and a normal active state.

* * * * *